United States Patent
Trickler et al.

(10) Patent No.: US 10,405,404 B1
(45) Date of Patent: Sep. 3, 2019

(54) LIGHTING CONTROLS DATA SYNCHRONIZATION

(71) Applicant: ABL IP HOLDING LLC, Conyers, GA (US)

(72) Inventors: Christopher Trickler, Loganville, GA (US); Mark Norton, Oxford, GA (US); Richard L. Westrick, Jr., Social Circle, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 16/186,908

(22) Filed: Nov. 12, 2018

(51) Int. Cl.
*H05B 37/02* (2006.01)
*H04L 29/08* (2006.01)

(52) U.S. Cl.
CPC ........ *H05B 37/0254* (2013.01); *H04L 67/12* (2013.01); *H05B 37/0218* (2013.01); *H05B 37/0227* (2013.01)

(58) Field of Classification Search
CPC .. H05B 37/02; H05B 37/029; H05B 37/0227; H05B 37/0254; H05B 37/0272; H05B 37/0245; H05B 37/0236; H04L 12/282; H04L 12/2807; H04L 12/4625; H04L 67/125; H04L 2012/2841; Y02B 20/44; Y02B 20/48
See application file for complete search history.

(56) References Cited

U.S. PATENT DOCUMENTS

| | | | | |
|---|---|---|---|---|
| 6,388,399 B1 * | 5/2002 | Eckel | ..................... | G01K 1/024 315/158 |
| 8,280,558 B2 * | 10/2012 | Picco | ................. | H05B 37/0254 700/295 |
| 9,413,171 B2 * | 8/2016 | Neyhart | .............. | H04L 12/2807 |
| 9,462,663 B2 * | 10/2016 | Aggarwal | .......... | H05B 37/0227 |
| 9,478,065 B2 * | 10/2016 | Billeter | ................. | G06T 15/005 |
| 9,930,763 B1 * | 3/2018 | Trickler | ............. | H05B 37/0245 |

* cited by examiner

*Primary Examiner* — Haissa Philogene
(74) *Attorney, Agent, or Firm* — RatnerPrestia

(57) ABSTRACT

A lighting control system includes a plurality of lighting system elements that are connected together over at least one lighting control network. The lighting system elements include a network controller, a luminaire, or a lighting control device. Some of the lighting system elements are designated as client lighting devices. At least one of the lighting system elements is designated as a lighting control data synchronization master. The lighting control system allows for changes in lighting control setting data, without sacrificing performance and maintaining stability with network failures, by generation and utilization of lighting control data keys. For example, data synchronization replicates or transfers lighting control setting data when a state change in a lighting control setting is detected based on a comparison of a current lighting control data key with an original lighting control data key.

20 Claims, 12 Drawing Sheets

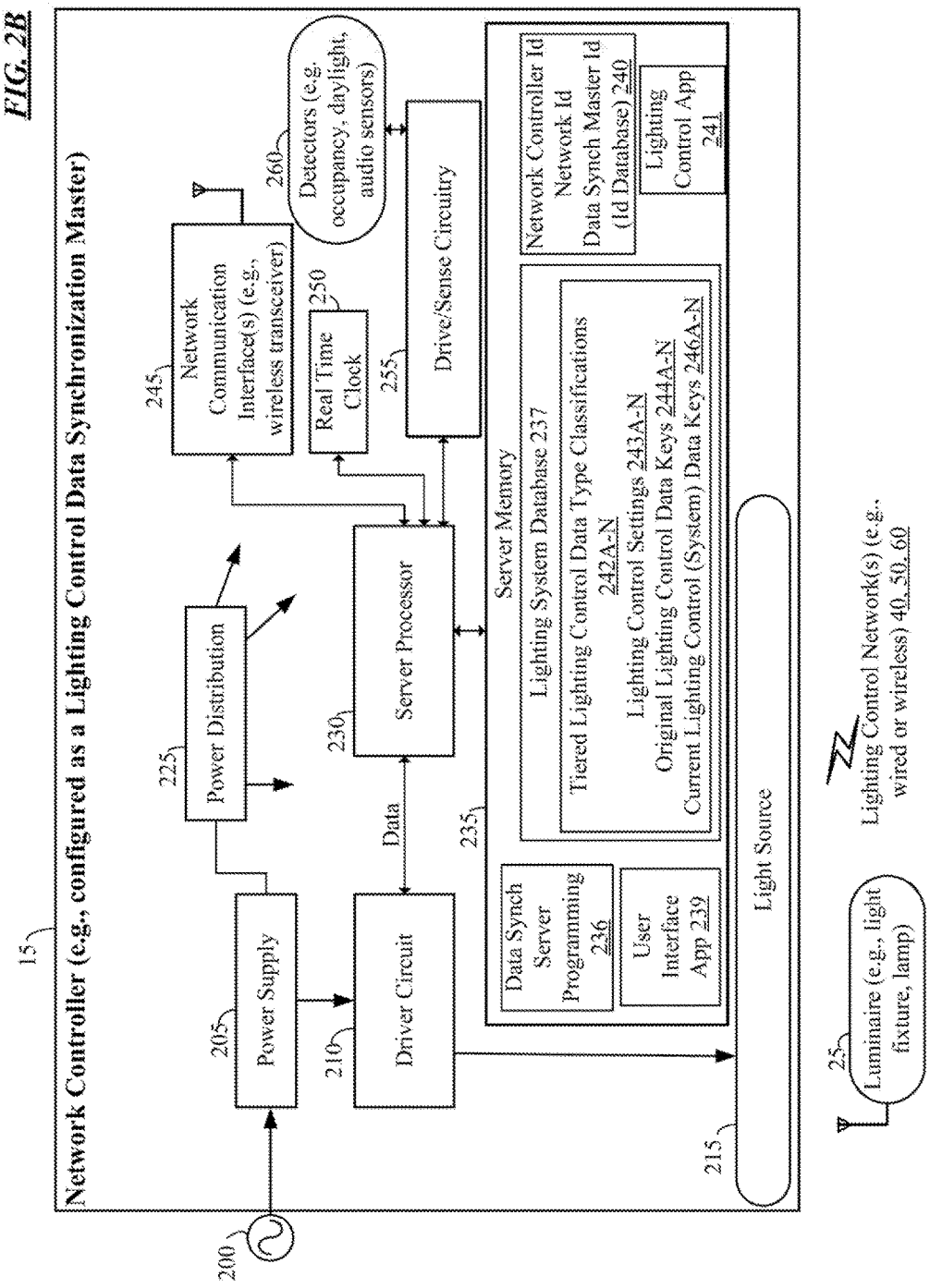

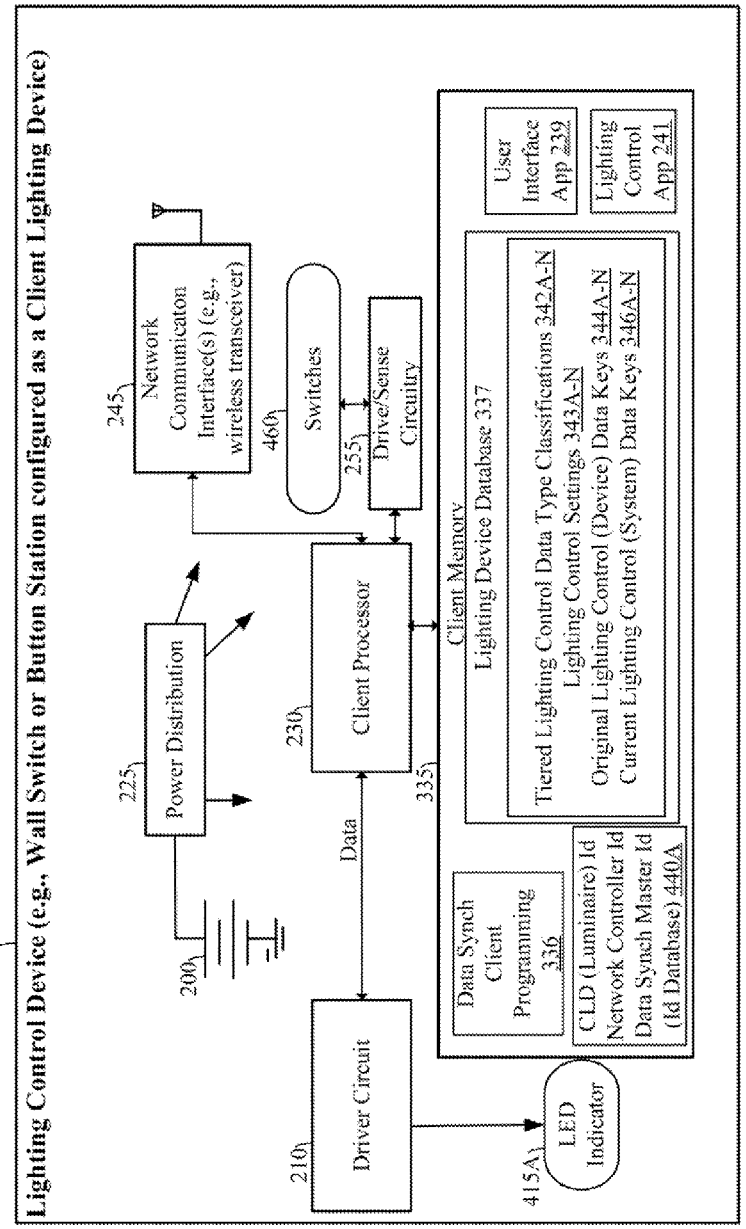

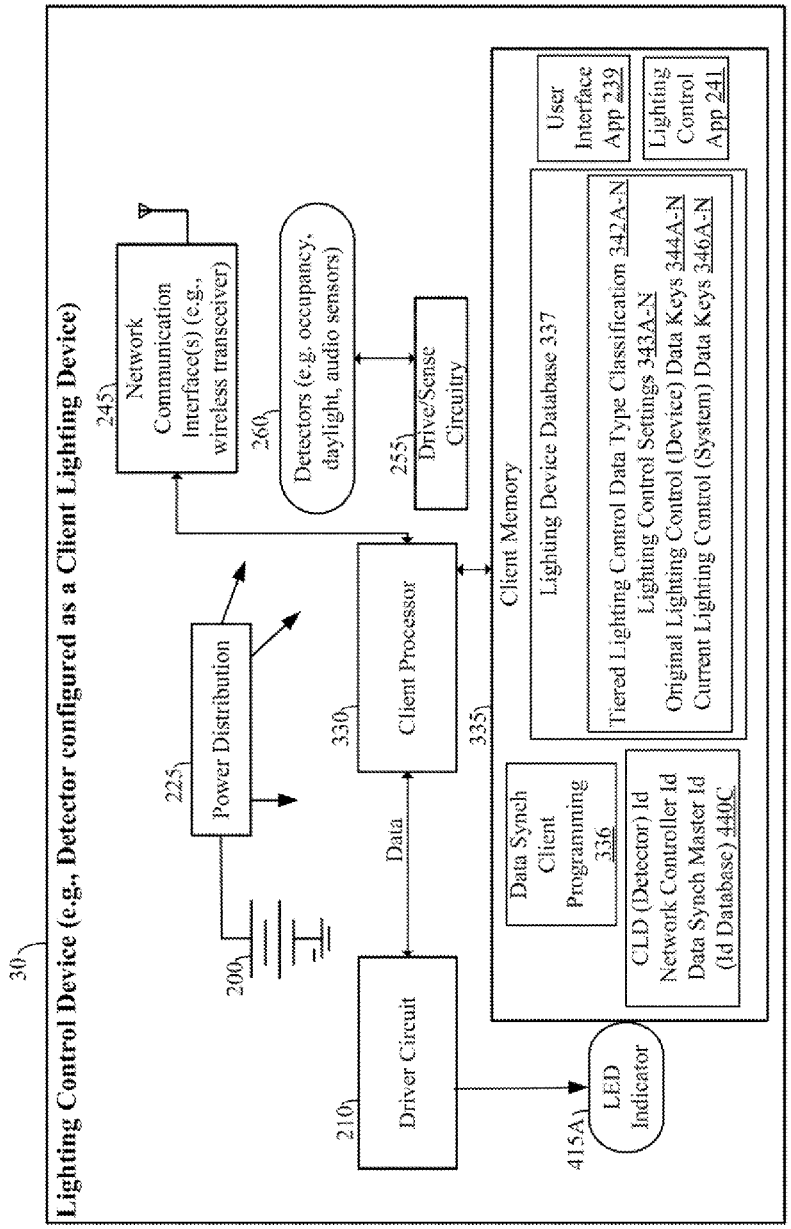

*FIG. 5A*

Lighting System Database 237

| Tiered Lighting Control Data Type Classifications 242A-E | Current Lighting Control (System) Data Keys 246A-E | Lighting Control Settings 243A-N | |
|---|---|---|---|
| | | Data Identifiers 505A-N | Data Values 510A-N |
| Local Data 242A | FE44 244A | Address = 1000 505A | Time Delay = 30 Seconds 510A |
| | | Address = 1000 505B | Name = Sensor #1 510B |
| | | Address = 1001 505C | Time Delay = 45 Seconds 510C |
| | | Address = 1002 505D | Name = Sensor #2 510D |
| Room Data 242B | AC1F 244B | Room #1 505E | Name = Office 510E |
| | | Luminaires 505F | Trim Level = 5% Min & 95% Max 510F |
| | | Room #1 Controlling Switch Identifiers for Luminaires 505G | Switch Identifiers = 4-6 510G |
| | | Channel #1 505H | Control = Zone 1 510H |
| | | Channel #2 505I | Control = Zone 2 510I |
| Building Data 242C | B31E 244C | Occupancy Sensors 505J | Time Delay = 30 seconds 510J |
| | | Wall Switches 505K | Timeout Period = 15 minutes 510K |
| | | Button Stations 505L | Button Configuration Setting 510L: Button 1 = ON Button 2 = OFF Button 3 = Raise Button 4 = Lower |
| Network Data 242D | F21C 244D | Network Controllers 505M | Graphical User Interface Appearance Background Color = Blue 510M |
| Global Data 242E | D81A 244E | Daylight Sensors 505N | Illumination Light Output Based on Sensed Day Light Measurement 510N: X Lux = 50% Max Y Lux = 75% Max |

*FIG. 5B*

Lighting Device Database 337

| Tiered Lighting Control Data Type Classifications 342A | Original Lighting Control (Device) Data Keys 344A | Current Lighting Control (System) Data Keys 346A | Lighting Control Settings 343A-D | |
|---|---|---|---|---|
| | | | Data Identifiers 505E-H | Data Values 510E-H |
| Room Data 342A | BD12 344A | AC1F 346A | Room #1 505E | Name = Office 510E |
| | | | Luminaires 505F | Trim Level = 5% Min & 95% Max 510F |
| | | | Room #1 Controlling Switch Identifiers for Luminaires 505G | Switch Identifiers = 4-6 510G |
| | | | Channel #1 505H | Control = Zone 1 510H |

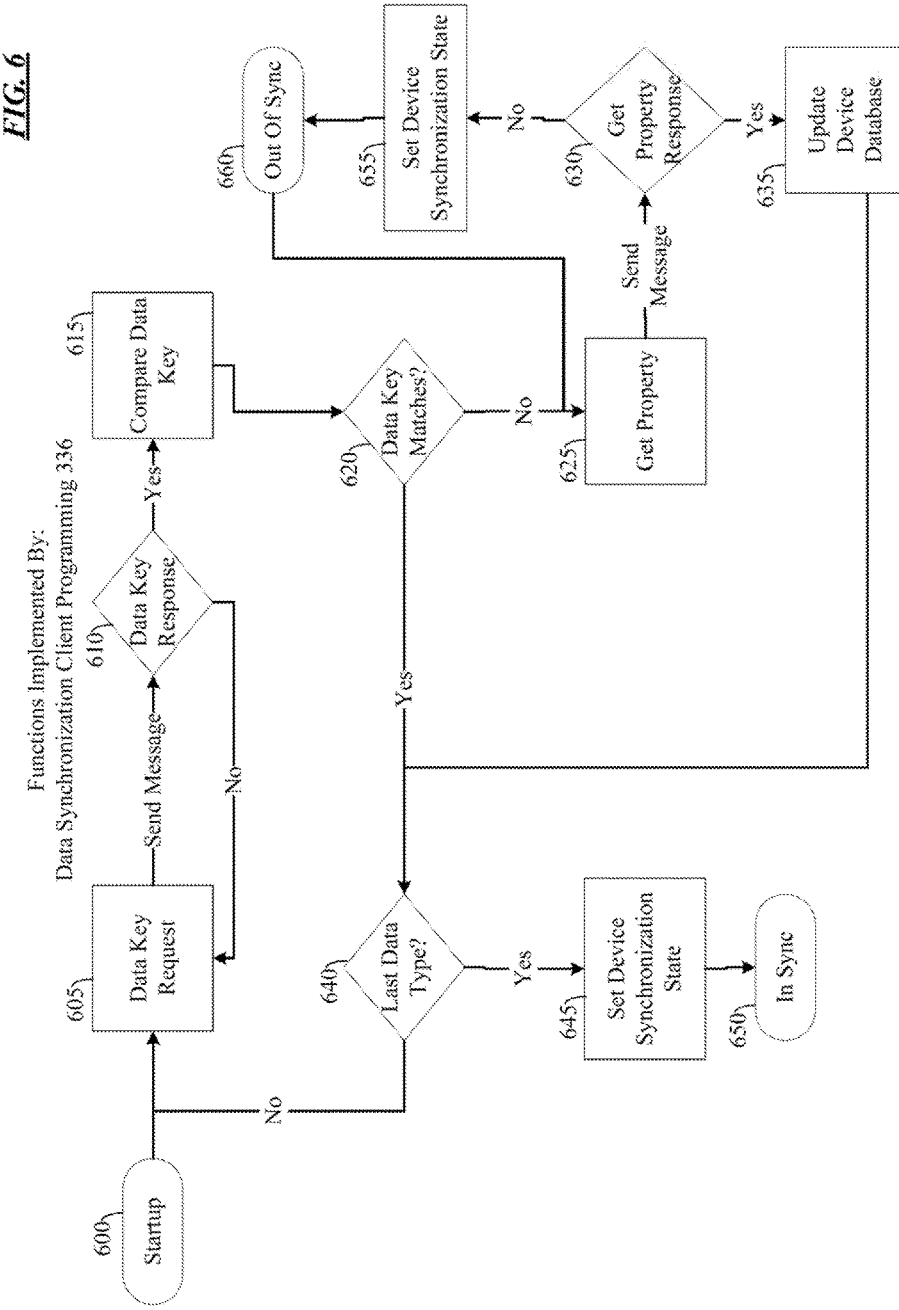

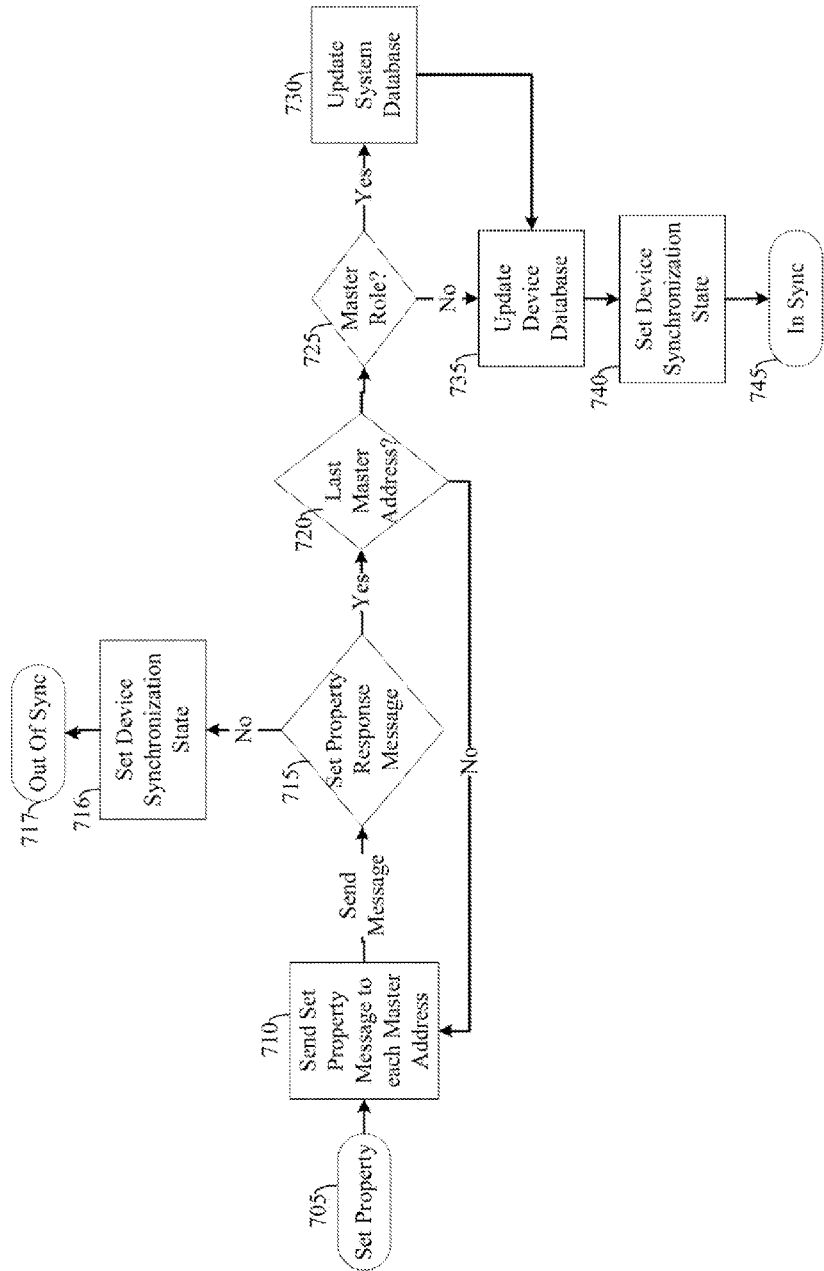

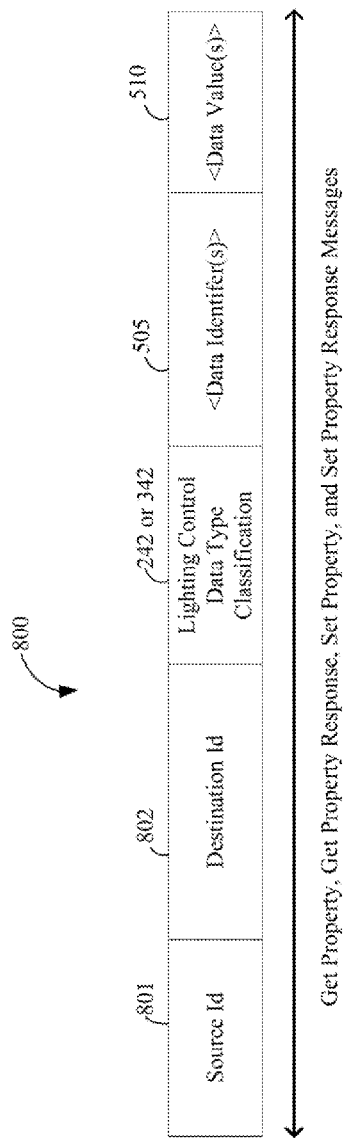

LIGHTING CONTROLS DATA SYNCHRONIZATION

BACKGROUND

Traditional luminaires can be turned ON and OFF, and in some cases may be dimmed, usually in response to user activation of a relatively simple input device. Often, traditional luminaires are controlled individually or as relatively small groups at separate locations.

More sophisticated lighting control systems automate the operation of the luminaires throughout a building or residence based upon lighting control conditions, such as occupancy sensing and/or daylight sensing. Such lighting control systems can receive sensor signals at a central lighting control panel (centralized controller device), which responds to the received signals by deciding which, if any, relays, switching devices, and/or dimming ballasts to drive in order to turn on or off and/or adjust the light levels of one or more luminaires.

Lighting control setting data within a networked lighting control system can determine performance, complexity, and robustness of the system. In networked lighting control systems, lighting control setting data is used to affect a space for various sensors, such as occupancy and photocells. The data can determine user preferences and behaviors what is expected to happen when triggered by sensors. The lighting control setting data is also used for programmable wall switches and other lighting preferences such as scene configuration and other user controls related preferences.

In some network lighting control system designs, the lighting control setting data is stored with a centralized controller; and all other networked controls components receive their lighting control setting data on startup or as needed from the centralized controller, or send messages to the centralized controller to obtain the lighting control setting data. The centralized controller performs control operations, status updates, and other user-programmable actions upon receiving the message. The design can be faulty due to the lighting control setting data being stored on a single centralized controller in the event the centralized controller fails. Performance issues may also be apparent, as data is required to reach the centralized controller first for determining next action in the network lighting control system.

In other lighting control system designs, lighting control setting data may be stored within individual devices or stored across some number of devices in a distributed lighting control system design. These alternate designs are less prone to single device failure, but instead can be exposed to failures or changes in the lighting control system should a device be offline during programming changes.

A lighting control system is needed to overcome these and other limitations in the art.

SUMMARY

Additional objects, advantages and novel features of the examples will be set forth in part in the description, which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In a first example, a lighting control system includes a plurality of lighting system elements that are connected together over at least one lighting control network. The lighting system elements include a network controller, a luminaire, or a lighting control device. Some of the lighting system elements are designated as client lighting devices. At least one of the lighting system elements is designated as a lighting control data synchronization master.

Each respective one of the client lighting devices includes a client network communication interface for communication over a lighting control network, a client memory including a lighting device database, and a client processor having access to the client memory and the client network communication interface. Each respective one of the client lighting devices includes data synchronization client programming in the memory. Execution of the data synchronization client programming by the client processor configures the client lighting device to perform functions, including functions to receive, via the at least one lighting control network, from the lighting control data synchronization master, multiple original lighting control data keys of tiered lighting control data type classifications. Each respective original lighting control data key is associated with a respective tiered lighting control data type classification to adjust at least one respective lighting control setting. Execution of the data synchronization client programming by the client processor configures the client lighting device to send, via the at least one lighting control network, from the client lighting device to the lighting control data synchronization master, a data key request message for each respective tiered lighting control data type classification that is supported on the client lighting device or desired for synchronization. Depending on the implementation, the sent data key request message may be for just one type or multiple types of tiered lighting control data type classifications that are actually sought for by the client light device (e.g., the client lighting device actually desires to synchronize).

Execution of the data synchronization client programming by the client processor configures the client lighting device to in response to the data key request message, receive, via the at least one lighting control network, from the lighting control data synchronization master, a data key response message that includes a respective current lighting control data key for each respective tiered lighting control data type classification. Execution of the data synchronization client programming by the client processor configures the client lighting device to for each respective tiered lighting control data type classification, compare the respective current lighting control data key with the respective original lighting control data key to detect a state change in the at least one respective lighting control setting. Execution of the data synchronization client programming by the client processor configures the client lighting device to, based on the comparison, determine whether each respective tiered lighting control data type classification is synchronized or not synchronized at the client lighting device.

In a second example, a method includes receiving, via at least one lighting control network, at a client lighting device from a lighting control data synchronization master, multiple original lighting control data keys of tiered lighting control data type classifications. Each respective original lighting control data key is associated with a respective tiered lighting control data type classification to adjust at least one respective lighting control setting. The method further includes sending, via the at least one lighting control network, from the client lighting device to a lighting control data synchronization master, a data key request message for each respective tiered lighting control data type classification. The method further includes in response to the lighting control data key synchronization request message, receiving, via the at least one lighting control network, at the client lighting device from the lighting control data synchronization master, a data key response message that includes a respective current lighting control data key for each respective tiered lighting control data type classification. The method further includes for each respective tiered lighting control data type classification, comparing the respective current lighting control data key with the respective original lighting control data key to detect a state change in the at least one respective lighting control setting. The method further includes based on the comparison, determining whether each respective tiered lighting control data type classification is synchronized or not synchronized at the client lighting device.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIGS. 2A-B are block diagrams of a network controller configured as a lighting control data synchronization master that communicates via the lighting control system of FIG. 1.

FIGS. 4A-C are block diagrams of various lighting control devices configured as a client lighting device that communicate via the lighting control system of FIG. 1.

FIG. 5A is a lighting system database that includes tiered lighting control data type classifications, lighting control data keys, and lighting control settings.

FIG. 5B is a lighting device database that includes tiered lighting control data type classifications, lighting control data keys, and lighting control settings.

FIG. 6 is a flow chart illustrating functions implemented in the data synchronization client programming of the client lighting devices of FIGS. 3 and 4A-C.

FIG. 7 is a flow chart illustrating functions implemented in the data synchronization client programming of the client lighting devices of FIGS. 3 and 4A-C and the data synchronization server programming of the lighting control data synchronization master of FIGS. 2A-B.

FIG. 8 depicts a format of get property, get property response, set property, and set property response messages as described in FIGS. 6-7.

DETAILED DESCRIPTION

Figure 1:
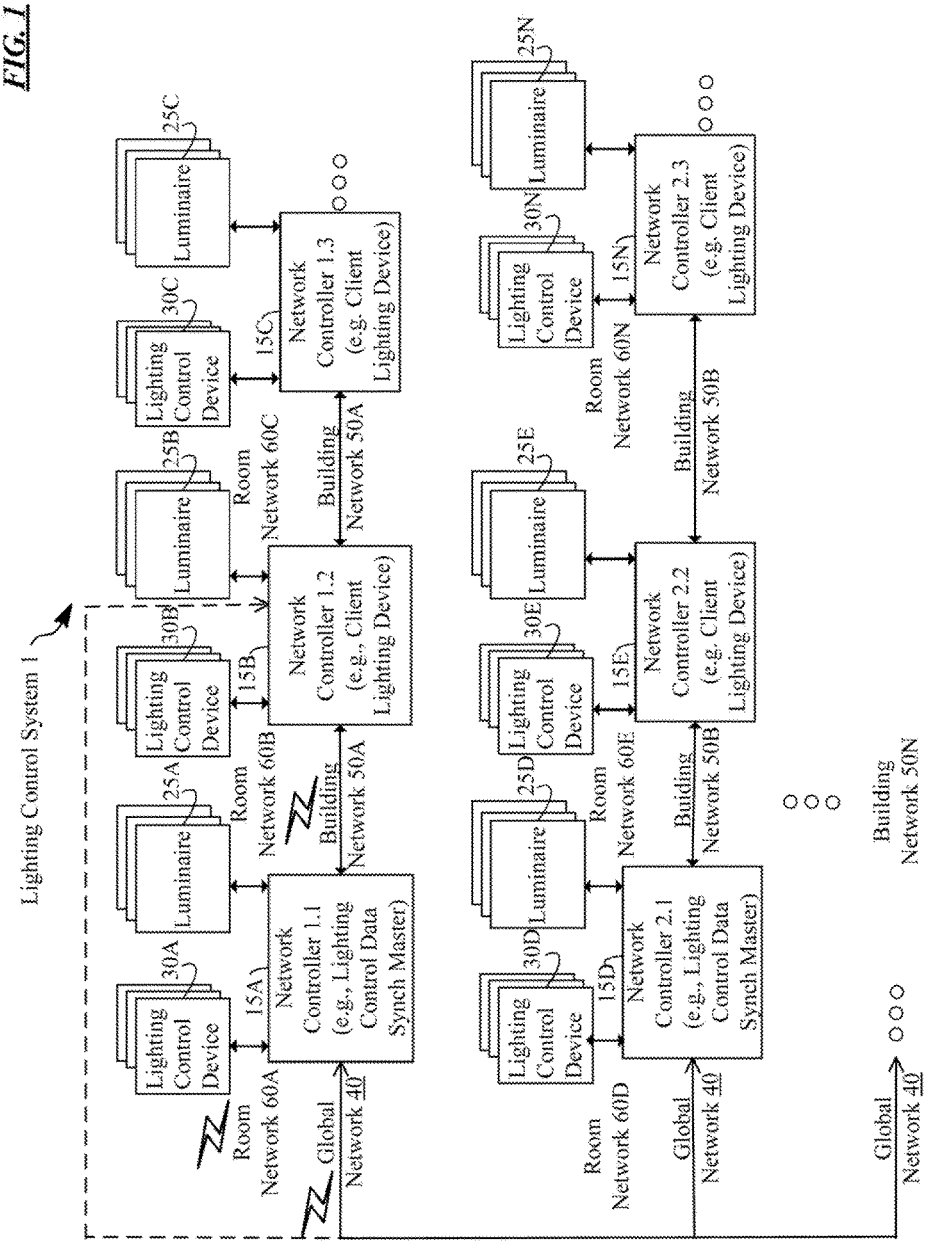
FIG. 1 is a high-level functional block diagram of an example of a lighting control system of various lighting control networks and lighting system elements designed for lighting control setting data synchronization.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

A proposed programming solution (e.g., application level) is applied to either centralized or distributed lighting control system designs, which allows for changes in lighting control setting data, without sacrificing performance and maintaining stability with lighting control network failures. The proposed solution uses data synchronization of lighting control setting only amongst lighting system elements of the lighting control system. Lighting control data synchronization involves replicating or transferring lighting control setting data when a change is made from an originating lighting system element to ensure the change is applied to the entirety of applicable elements of the lighting control system. The proposed solution defines a model and collection of processes, which allow changes to be made to the lighting control system without compromising the consistency of lighting control setting data and networked device operation.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g., of sufficient intensity for general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

Terms such as "artificial lighting" or "illumination lighting" as used herein, are intended to encompass essentially any type of lighting that a device produces light by processing of electrical power to generate the light. A luminaire for an artificial lighting or illumination lighting application, for example, may take the form of a lamp, light fixture, or other luminaire arrangement that incorporates a suitable light source, where the lighting device component or source(s) by itself contains no intelligence or communication capability. The illumination light output of an artificial illumination type luminaire, for example, may have an intensity and/or other characteristic(s) that satisfy an industry acceptable performance standard for a general lighting application.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals Reference now is made in detail to the examples illustrated in the accompanying drawings and discussed below. FIG. 1 is a high-level functional block diagram of an example of a lighting control system 1 of various lighting control networks (e.g., global network 40, building networks 50AN, and room networks 60A-N) and lighting system elements designed for lighting control setting data synchronization. Lighting control system 1 includes a plurality of lighting system elements (e.g., 15A-N, 25A-N, and 30A-N) that are coupled or connected together over at least one of the lighting control networks (e.g., 40, 50AN, and 60A-N). The lighting system elements (e.g., 15A-N, 25A-N, and 30A-N) can include a network controller 15A-N, a luminaire 25A-N, or a lighting control device 30A-N. Some of the lighting system elements (e.g., 15A-N, 25A-N, and 30A-N) are designated as client lighting devices (CLDs). At least one of the lighting system elements (e.g., 15A-N, 25A-N, and 30A-N) is designated as a lighting control data synchronization master, for example, network controllers 15B, 15D are lighting control data synchronization masters on respective building lighting control networks 50A, 50B.

Network controllers 15A-N are typically a graphical front-end component on the lighting controls network. However, a network controller can be a networked lighting luminaire, an occupancy sensor, a photosensor, a thermostat, a wall switch, or other controls networked component. As part of the lighting control data synchronization process, a network controller 15A-N has a unique address and may have other optional identifiers. Network controller 15A-N may have a logical identifier associating the device to a physical location such as a specific room. The network controller 15A-N may have a logical identifier associating the device to a logical network such as a branch of devices on the floor of a building.

The lighting control data synchronization master role can be a network controller 15A-N, which executes programming to implement a data synchronization server process. The method by which a network controller is specified to be this role or becomes this role, for example, by automatic negotiation on the network can vary. The lighting control data synchronization master role can be a configuration setting or a simple periodic broadcast message indicating the network controller 15A-N is performing this role. Lighting system elements (e.g., 15A-N, 25A-N, and 30A-N), which execute programming implementing a data synchronization client update a reference indicating the address to send data key request messages to during the synchronization process, which is the master address. The master address is a unique id or address of a controller which is operating as a lighting control data synchronization master role within the lighting control data synchronization process.

The lighting control system 1 can rely on any of network controllers 15A-N to implement lighting control setting data synchronization across building networks 50A-B and global network 40. Generally, network controllers 15A-N are nodes that allow input or modification of lighting control setting data, act on lighting control setting data and control end devices, such as luminaires 25A-N and lighting control devices 30A-N within the lighting control system 1. Each network controller 15A-N has a unique identifier and hardware/software elements, such as a microprocessor, real time clock, user interface, storage, and networking components. Network controllers 15A-N can be a touch screen device (e.g., commercially available from Acuity Brands Lighting under the trade name Fresco®), a mobile device, such as a tablet computer or smartphone, a lighting management panel or module (e.g., under the trade name Fresco®), low voltage wall station (e.g., commercially available from Acuity Brands Lighting under the trade name nLight®), network wall switch sensors (e.g., under the trade name nLight®), or intelligent luminaire with on-board controls and sensors. Upon generation or modification of such lighting control setting data, designated lighting control data synchronization masters 15A, 15D communicate the lighting control setting data to client lighting devices (luminaires 25A-N and lighting control devices 30A-N). Lighting system element devices can be a networked lighting luminaire, an occupancy sensor, a photo-sensor, a thermostat, a wall switch or other controls networked component. As part of the lighting control data synchronization process, the lighting system elements have a unique address and other optional identifiers.

As shown, luminaires 25A-N and lighting control devices 30A-N are coupled or connected to the acting lighting control data synchronization masters 15A, 15D via a respective building network 50A-B although the connection passes through a respective room network 60A-N. When full or partial failure of an acting lighting control data synchronization master 15A or network communication therewith occurs, the lighting control system 1 changes the lighting control data synchronization master to a different lighting system element, such as network controller 15B based on a failover protocol procedure. In contrast to a lighting control system that relies on a single controlling device, the illustrated lighting control system 1 functions as intended even in the event of network failure.

The luminaires 25A-N do not have to be directly connected to respective network controllers 15A-N or lighting control data synchronization masters 15A, 15D (which can serve as a control panel) in order to receive lighting control settings. For example, because luminaires 25A-N are controlled by respective lighting control device 30A-N, some or all communication destined to or from respective network controllers 15A-N or lighting control data synchronization masters 15A, 15D related to lighting control setting data is via respective lighting control devices 30A-N. Hence, luminaires 25A-N can be indirectly connected to respective network controllers 15A-N or lighting control data synchronization masters 15A, 15D through respective lighting control devices 30A-N in order to receive lighting control settings. In other words, luminaires 25A-N can be driven or controlled by lighting control devices 30A-N via room networks 60A-N. Of note, several network controllers 15A-N or lighting control devices 30A-N can control a single luminaire 25A-N.

The network topology of lighting control system 1 includes a collection of lighting system elements or components comprised of network controllers 15A-N, luminaires 25A-N (e.g., light fixtures, table lamps, floor lamps, or night lights) and lighting control devices 30A-N. The light fixture is, for example, a recessed cove fixture, under-cabinet lighting, direct/indirect pendant lighting, a recessed can, wall wash lighting, a wall sconce, task lighting, and a recessed fluorescent light, a chandelier, a ceiling fan light, an outdoor yard light, etc. The system components are connected by a specific combination of hierarchal wired, wireless, and virtual connections. The illustrated networks 40, 50A-N, and 60A-N can be via nLight® (commercially available from Acuity Brands Lighting), digital multiplex (DMX) control, Fresco® control network (FCN) (commercially available from Acuity Brands Lighting), Ethernet, a local area network, (LAN, e.g., Intranet), a wide area network (WAN, e.g., Internet), wireless mesh network (e.g., ZigBee), and a personal area network (e.g., Bluetooth or Z-Wave). FCN, DMX control, nLight®, and Z-Wave are lighting-centric networks that control a variety of luminaires, and therefore are utilized for building networks 50A-N and room networks 60A-N, in the example. The global network 40 may be a LAN, such as Intranet, or Internet, in our example. Accordingly, global network 40, building networks 50A-N, and room networks 60A-N may utilize different communication protocols, for example, the lighting control system 1 is a hierarchical network. The global network 40, building networks 50A-N, and room networks 60A-N are separate networks but with a shared application protocol for lighting control setting data synchronization. It should be appreciated, however, that global network 40, building networks 50A-N, and room networks 60A-N may be a different part of the same network tree or star network, and therefore are not separate networks and can utilize the same network communication protocols.

Multiple network controllers 15A-N may be connected by a separate network defined as a global network 40. Certain network controllers 15A-N are designated as lighting control data synchronization masters 15A, 15D. The network controllers 15A-N that are currently acting as lighting control data synchronization masters 15A, 15D are connected by global network 40 to allow for the passing/transmission of global lighting control setting data (e.g., time-based lighting controls that span global network 40). The separation of networks 40, 50A-N, 60A-N in this hierarchal method allows for isolation of network communication, events, and errors to a particular network.

Subsets of network controllers 15A-N are connected by a particular building network 50A-N to allow for transmission of local lighting control setting data (lighting controls that span a particular building network 50A-N). As shown, network controllers 15A-C are in communication via building network 50A. Network controller 15B connects to a respective luminaire 25B via a wireless room network 60B, such as a lighting-centric wireless communication network, that is totally separate from building network 50A and global network 40. Also, building network 50A and global network 40 are each separate wired or wireless communication networks.

Designation of which of network controllers 15A-N act as a lighting control data synchronization master on a particular building network 50A-N changes. For example, upon failure of lighting control data synchronization master 15A, network controller 15B is designated as lighting control data synchronization master of building network 50A and network controllers 15B-C connect to global network 40 for the passing of building lighting control setting data. Global network 40 includes a second plurality of network controllers 15D-F, and network controller 15D is designated as the lighting control data synchronization master for a respective building network 50B. In response to determining that the second network controller 15B is the lighting control data synchronization master, the second network controller 15B transmits (e.g., broadcasts), on the global network 40 a message to the second plurality of network controllers 15D indicating that the second network controller 15B is the lighting control data synchronization master of the first building network 50A, and vice versa.

Luminaires 25A-N and lighting control devices 30A-N are connected to a particular network controller 15A-N by a respective room network 60A-N to allow for transmission of specific room lighting control setting data, building lighting control setting data specific to a respective building network 50A-N, and global lighting control setting data for the entire global network 40. As shown, luminaire 25A and lighting control device 30A are in communication with lighting control data synchronization master 15A via room network 60A. Further, luminaire 25D and lighting control device 30D are in communication with network controller 15D via room network 60D. Through a respective network controller 15A-N, luminaires 25A-N, and lighting control devices 30A-N are networked with other devices on a respective room network 60A-N.

A variety of lighting control setting data is transmitted over networks 40, 50A-N, and 60A-N, including, controls to turn lights on/off, adjust dimming level (dim up/down), set scene (e.g., a predetermined light setting), and sensor trip events. Each network controller 15A-N, luminaire 25A-N, and lighting control device 30A-N, can be equipped with wireless transceiver(s), such as a near range Bluetooth Low Energy (BLE) radio. To allow for wireless communication over all three types of networks 40, 50A-N, and 60A-N, each of the network controllers 15A-N, luminaires 25A-N, and lighting control devices 30A-N may include separate radios that operate at three different frequencies, such as sub-GHz (e.g., 900 MHz), Bluetooth Low Energy (BLE 2.4 GHz), and 5 GHz, for example.

Luminaires 25A-N can be dimmable, such as a dimmable light fixture, and comprise light emitting diodes (LEDs) that emit red, green, and blue (RGB) light or tunable white light. Luminaires 25A-N are coupled to respective lighting control devices 30A-N to receive lighting control setting data and related messages via a respective network controller 15A-N. Daylight, occupancy, and audio sensors or switches can be embedded in lighting control devices 30A-N, luminaires 25A-N, or even network controllers 15A-N to enable lighting control setting data to be generated and transmitted via network controllers 15A-N based on occupancy and dimming adjustments, for example.

Each respective one of the client lighting devices (e.g., 15B, 15C, 15E, 15F, 25A-N, and 30A-N) includes a client network communication interface for communication over the at least one lighting control network (e.g., 40, 50A-N, and 60A-N), a client memory including a lighting device database, and a client processor having access to the client memory and the client network communication interface. Each respective one of the client lighting devices (e.g., 15B, 15C, 15E, 15F, 25A-N, and 30A-N) includes data synchronization client programming in the client memory. Execution of the data synchronization client programming by the client processor configures the client lighting device to perform functions, including functions to receive, via the at least one lighting control network, from the lighting control data synchronization master, multiple original lighting control data keys of tiered lighting control data type classifications. Each respective original lighting control data key is associated with a respective tiered lighting control data type classification to adjust at least one respective lighting control setting. Execution of the data synchronization client programming by the client processor configures the client lighting device to send, via the at least one lighting control network, from the client lighting device to the lighting control data synchronization master, a data key request message for each respective tiered lighting control data type classification that is supported on the client lighting device or desired for synchronization. Depending on the implementation, the sent data key request message may be for just one type or multiple types of tiered lighting control data type classifications that are actually sought for by the client light device (e.g., the client lighting device actually desires to synchronize).

A lighting control data key is a unique identifier, signature, hash value, 16-bit CRC, date and timestamp, or other generated value based on the contents of each tiered lighting control data type classification. When the contents of the tiered lighting control data type classification are changed, the lighting control data key is re-generated to ensure uniqueness. This lighting control data key is used for quickly comparing the client and server state of the lighting control setting data. There are two references for a data key: the device data key and the system data key. The device data key is the data key for a particular device and a given data type. The system data key is the data key for a given data type maintained within the system data.

Execution of the data synchronization client programming by the client processor configures the client lighting device (e.g., 15B, 15C, 15E, 15F, 25A-N, and 30A-N) to in response to the data key request message, receive, via the at least one lighting control network (e.g., 40, 50A-N, and 60A-N), from the lighting control data synchronization master 15A, 15D, a data key response message that includes a respective current lighting control data key for each respective tiered lighting control data type classification. Execution of the data synchronization client programming by the client processor configures the client lighting device (e.g., 15B, 15C, 15E, 15F, 25A-N, and 30A-N) to for each respective tiered lighting control data type classification, compare the respective current lighting control data key with the respective original lighting control data key to detect a state change in the at least one respective lighting control setting. Execution of the data synchronization client programming by the client processor configures the client lighting device (e.g., 15B, 15C, 15E, 15F, 25A-N, and 30A-N) to, based on the comparison, determine whether each respective tiered lighting control data type classification is synchronized or not synchronized at the client lighting device (e.g., 15B, 15C, 15E, 15F, 25A-N, and 30A-N).

Figure 2A:
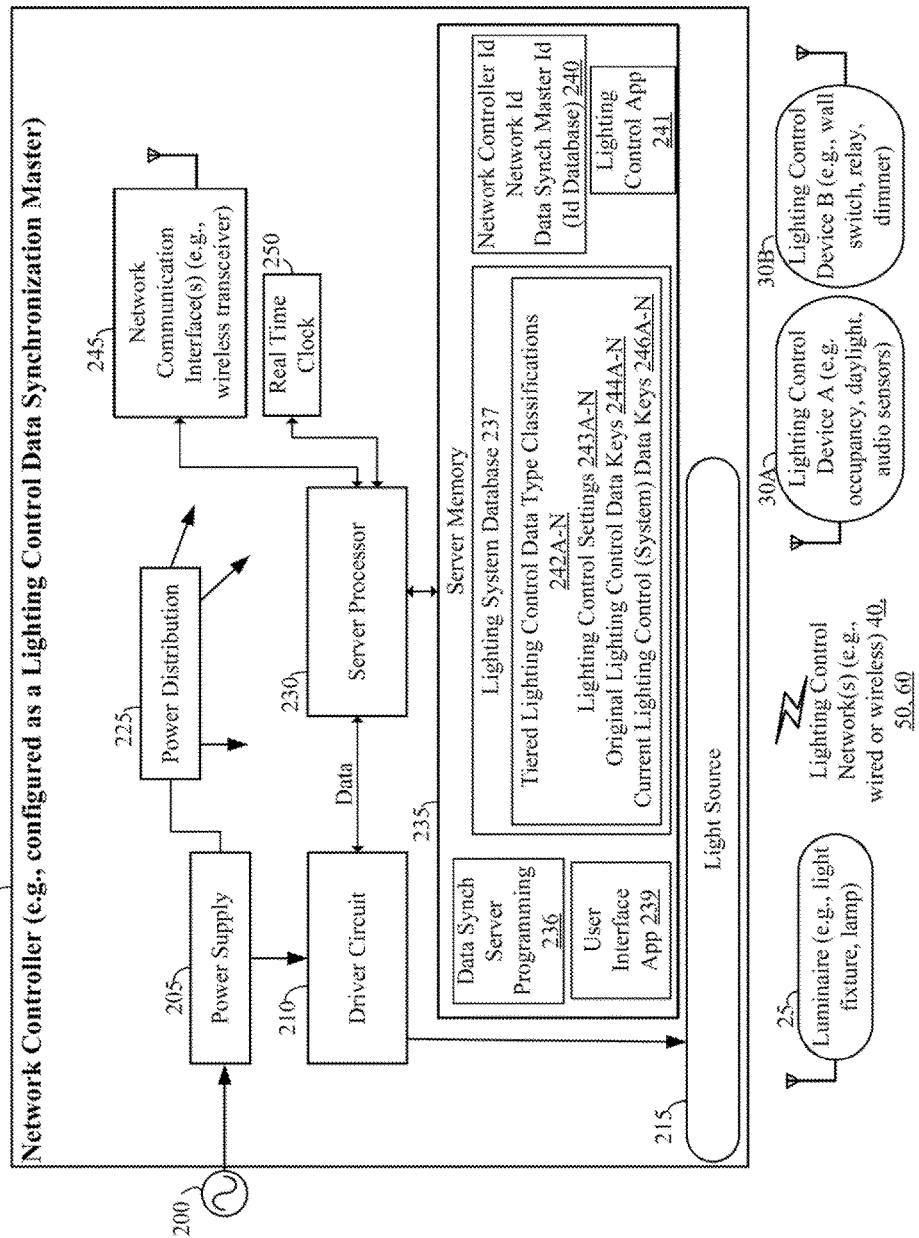

FIGS. 2A-B are block diagrams of a network controller 15 configured as a lighting control data synchronization master that communicates via the lighting control system 1 of FIG. 1. Two different architectures are shown for the network controller 15 in FIGS. 2A-B. As shown in FIG. 2A, the network controller 15 is in communication with a luminaire 25 (e.g., a luminaire or lamp), lighting control device 30A (e.g. occupancy, daylight, or audio sensors), and lighting control device 30B (e.g., wall switch, relay, or dimmer). In FIG. 2B, drive/sense circuitry 255 and detectors 260 are on-board the network controller 15. Detectors 260 can be infrared sensors for occupancy or motion detection, an in-fixture daylight sensor, an audio sensor, a temperature sensor, or other environmental sensor. Drive/sense circuitry 255, such as application firmware, drives the occupancy, audio, and photo sensor hardware. It should be understood that network controller 15 may not necessarily include driver circuit 210, light source 215, or drive/sense circuitry 255 as part of the network controller 15 structure because control of a luminaire does not have to reside within the network controller 15 itself.

Network controller 15 can be an integrated luminaire (or a standalone touchscreen device) that includes a power supply 205 driven by a power source 200. Power supply 205 receives power from the power source 200, such as an AC mains, battery, solar panel, or any other AC or DC source. Power supply 205 may include a magnetic transformer, electronic transformer, switching converter, rectifier, or any other similar type of circuit to convert an input power signal into a power signal suitable for light source 215. Light source 215 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 215 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Network controller 15 further includes, a driver circuit 210, for example, an intelligent light emitting diode (LED) driver circuit. Driver circuit 210 is coupled to light source 215 and drives that light source 215 by regulating the power to light source 215 by providing a constant quantity or power to light source 215 as its electrical properties change with temperature, for example. The driver circuit 210 provides power to light source 215. Driver circuit 210 may be a constant-voltage driver, constant-current driver, or AC LED driver type circuit that provides dimming through a pulse width modulation circuit and may have many channels for separate control of different LEDs or LED arrays that comprise light source 215. An example of a commercially available intelligent LED driver circuit 210 is manufactured by EldoLED®.

Driver circuit 210 can further include an AC or DC current source or voltage source, a regulator, an amplifier (such as a linear amplifier or switching amplifier), a buck, boost, or buck/boost converter, or any other similar type of circuit or component. Driver circuit 210 outputs a variable voltage or current to the light source 215 that may include a DC offset, such that its average value is nonzero, and/or a AC voltage.

For purposes of communication and control, network controller 10 is treated as a single or a multi-addressable device that can be configured to operate as a member of a global network 40, a respective building network 50A-N, and a respective room network 60A-N. If the network controller 15 is a luminaire, then network controller 15 is line powered and remains operational as long as power is available. Alternatively, if network controller 15 is a touch screen type device as described in FIG. 4B, network controller 15 may be battery powered.

Network controller 15 includes power distribution circuitry 225, a server processor 230, a server memory 235, and a real time clock 250. As shown, server processor 230 is coupled to driver circuit 210 and the server processor 230 includes a central processing unit (CPU) that controls the light source operation of the light source 215. Server memory 235 can include volatile and non-volatile storage. The real time clock 250 in conjunction with a real time operating system (RTOS) programming stored in the server memory 235 (not shown) support multiple concurrent processing threads for different simultaneous control or lighting control setting data synchronization failure communication operations of the network controller 10.

The power distribution circuitry 225 distributes power and ground voltages to the server processor 230, server memory 235, network communication interface(s) 245 (e.g., wireless transceivers), real time clock 250, drive/sense circuitry 255, and detector(s) 260 to provide reliable operation of the various circuitry on the network controller 15.

Network communication interface(s) 245 allows for data communication (e.g., wired or wireless) over all three types of networks 40, 50A-N, and 60A-N. For example, network controller 15 includes a tri-band wireless radio communication interface system configured for wireless communication via separate radios that operate at three different frequencies, such as sub-GHz (e.g., 900 MHz), BLE (2.4 GHz), and 5 GHz, for example. A first transceiver is for communication of global lighting control data messages, over a global network 40, of at least two different lighting control data synchronization masters, the two different lighting control data synchronization masters are connected to a separate LAN of respective network controllers. A second transceiver of such a network communication interface system is for communication of building lighting control setting data messages, over a first building network, with a first plurality of network controllers in communication over the first building network that includes a first network controller. A third transceiver is for communication, over a lighting room network, with a luminaire (e.g., a dimmable light fixture) or lighting control devices 30A-N of room lighting control setting data messages to adjust lighting intensity of the luminaire or other lighting control settings.

Server processor 230 like that shown in FIGS. 2A-B, client processor 330 like that shown in FIGS. 3 and 4A-C serve to perform various operations, for example, in accordance with instructions or programming executable by processors 230, 330. For example, such operations may include operations related to communications with various lighting system elements, such as luminaires 25A-N, lighting control devices 30A-B, and other network controllers 15A-N configured as a client lighting device or lighting control data synchronization master during the lighting control setting data synchronization procedure. Although a processor 230, 330 may be configured by use of hardwired logic, typical processors are general processing circuits configured by execution of programming. Processors 230, 330 include elements structured and arranged to perform one or more processing functions, typically various data processing functions. Although discrete logic components could be used, the examples utilize components forming a programmable CPU. A processor 230, 330 for example includes one or more integrated circuit (IC) chips incorporating the electronic elements to perform the functions of the CPU. The processors 230, 330 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in network controller 15, luminaires 25A-N, and lighting control devices 30A-N, network elements, etc.

Server memory or storage system 235 like that shown in FIGS. 2A-B and client memory 335 like that shown in FIGS. 3 and 4A-C are for storing data and programming. In the example, the memory system 235 may include a flash memory (non-volatile or persistent storage) and a random access memory (RAM) (volatile storage). The RAM serves as short term storage for instructions and data being handled by the server processor 230, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions, programming, or application(s) may be software or firmware used to implement any other device functions associated with network controller 15. Program aspects of the technology may be thought of as "products" or "articles of manufacture" typically in the form of executable code or process instructions and/or associated data that is stored on or embodied in a type of machine or processor readable medium (e.g., transitory or non-transitory), such as server memory 235, or a memory of a computer used to download or otherwise install such programming into the network controller 15, or a transportable storage device or a communications medium for carrying program for installation in the network controller 15.

As shown, the network controller 15 includes programming in the server memory 235, which configures the server processor 230 to control operations of the light source 215, including the communications over the network communication interface(s) 245 via the tri-band wireless radio communication interface system. The programming in the server memory 235 includes a data synchronization server programming 236, a user interface application 239, and lighting control application 241. The memory also stores an identifier database 240 that includes a network controller identifier, building network identifier, and lighting control data synchronization master identifier. Although not shown, the identifier database 240 for the lighting control data synchronization master, which is network controller 15 in the example, includes a list of client lighting device identifiers for network communication purposes, for example. Network controller identifier is a unique numeric (or alphanumeric) identifier of the network controller 15. Network controller identifier is unique per building network and the network identifier and the network controller identifier represent the overall uniqueness of the network controller 15. Network identifier is a unique numeric (or alphanumeric) identifier of the building network that the network controller 15 exists on. The network identifier may also represent a logical collection of network controllers on different and separate building networks 50A-N, for example, network identifier can be a zone identifier. Data synchronization master identifier is a unique identifier or address that signifies the priority of one network controller over another regarding how messages are handled (e.g., designation of which is the lighting control data synchronization master). Data synchronization master identifier uniquely identifies the lighting control data synchronization master operating as a master role within the data synchronization process, and in this case is identical to the network controller identifier. Upon receipt of messages, sending messages, or taking actions lighting control setting data synchronization actions, the network controller 15 checks the identifier database 240 in server memory 235 and determines network controller 15 is the lighting control data synchronization master.

The server memory 235 further comprises a lighting system database 237. Generally, a device that implements the data synchronization server has sufficient non-volatile or persistent memory available due to the management of lighting control setting data for the system within the lighting system database 237. The lighting system database 237 includes tiered lighting control data type classifications 242A-N, lighting control settings 243A-N, and lighting control data keys, which can include original lighting control data keys 244A-N that are previously generated, and current lighting control (system) data keys 246A-N. The lighting system database 237 makes up the configuration of all devices and components within the lighting control system 1 called the system data. The system data is present on each network controller 15, which implements the database synchronization server programming 236. The system data has data relative to individual lighting system element functions and configuration when the lighting system elements are networked together and participate as part of the lighting control system 1. The system data can also be thought of as the "source of truth" for configuration of all lighting system elements and networked components within the lighting control system 1. Database integrity and operations are used to ensure the stability and correctness of the data.

Tiered lighting control data type classifications 242A-N include several different lighting control data type classifications: for example, local data, room data, network data (e.g., building data), and global data. Hence, the lighting control setting data used for individual device function or logical groupings, or networked system operation is divided into classifications or lighting control data type classifications. The tiered lighting control data type classifications 242A-N are considered groupings of "like" configuration. If components within the system are to be configured or operate in a way similar to each other based on physical or logical organization or other type of classification and lighting control setting data type will exist for that classification. The lighting control data type classifications 242A-N are used within the lighting system database 237 and lighting device database 337. Tiered lighting control setting data type classifications 242A-N are not specific to any given lighting control system 1, and therefore a fewer or greater number of lighting control setting data type classifications 242A-N exist depending on physical or logical components within the lighting control system 1, user preferences, or other parameters.

Local data is configuration specific to a device, a particular sensor, luminaire (e.g., light fixture), wall switch, or other networked component that may have lighting control setting data relevant to its operation. Local data is often persisted at the specific device and upon change do not impact operation of other devices on the network. Examples of local data: LED override behavior indicating the state of an LED that should take precedence over other actions; occupancy timer indicating how long a sensor should wait before notification of the space being vacant; and dimming trim level, which determines lowest and highest output levels for a dimmable fixture. Room data is configuration to a logical room or space. Room data can be relevant to a single device or multiple devices that are physically located within a logical room or space. The room data applies to the operation, status, and behaviors of networked devices, which are contained with the room. Examples of room data: room name providing a textual reference on a user-interface to occupants within the room; channel lighting control setting data, which allows same control of output devices from different points within a physical space; room specific lighting state or scenes which determine the output state of multiple networked fixtures within the same physical space. Building data is configuration or control data, which resides within only a specific network controller 15 and other network controllers on a respective building network of the specific network controller 15. An instance of one such type of local data may be a sensor timeout that applies. A sensor timeout can represent time delay information regarding a sensor triggering an action, whereby the sensor is a specific lighting control device 30A connected to the specific network controller 15.

Network data is configuration specific to a logical network or network topology within the system. Examples of network data: communication parameters, which are shared amongst all devices connected to a branch within a network; a user-interface theme for devices with graphical user-interfaces to display the same style or layout across different networks. Global data is configuration applicable to the entire networked system. Global data includes configuration or control data, which resides within any number of network controllers or all network controllers. Individual devices within the system may need to know about configuration, which spans multiple networks and components. Examples of global data: zone assignment and lighting state due to output devices being controlled simultaneously across the network regardless of proximity; and scheduled events, which trigger changes on all components connected to the system, such as disabling all wall switch button presses during periods of the day. An instance of one such type of global data may be a zone that spans multiple building networks. A zone can represent the status of the lighting intensity for a collection of similarly controlled dimmable luminaires.

Data synchronization server programming 236 is firmware/software that engages in communications with the lighting system elements (15A-N, 25A-N, 30A-N), including other lighting control data synchronization masters and client lighting devices via networks 40, 50A-N, and 60A-N to carry out lighting control setting data synchronization. For example, execution of the data synchronization server programming 236 by the server processor 230 configures the lighting control data synchronization master 15 to perform functions, including functions to, for each tiered lighting control data type classification 242A-N, store in the lighting system database 237, the at least one respective lighting control setting 243A-N and the respective original lighting control data key 244A-N. Execution of the data synchronization server programming 236 by the server processor 230 further configures the lighting control data synchronization master 15 to generate, each respective original lighting control data key 244A-N as a 16 bit cyclic redundancy check (CRC), a hash value, a date, a timestamp, another identifier, or a combination thereof to uniquely identify the at least one respective lighting control setting 243A-N of the respective tiered lighting control data type classification 242A-N.

Execution of the data synchronization server programming 236 by the server processor 230 further configures the lighting control data synchronization master 15 to send, via the at least one lighting control network (e.g., 40, 50A-N, 60A-N) to the client lighting device, at least one of the tiered lighting control data type classifications 242A-N, the at least one respective lighting control setting 243A-N, and the respective original lighting control data key 244A-N. User interface application 239 receives user input of lighting control settings, for example, via a touch screen of network controller 15. Lighting control application 241 operates the driver circuit 241 to control light source 215, operates drive/sense circuit 255 to control detectors 260, and engages in network communications within the lighting control system 1. Execution of data synchronization server programming 236, user interface application 239, and lighting control application 241 by the server processor 230 configures network controller 15 to perform the respective functions outlined above.

Figure 3:
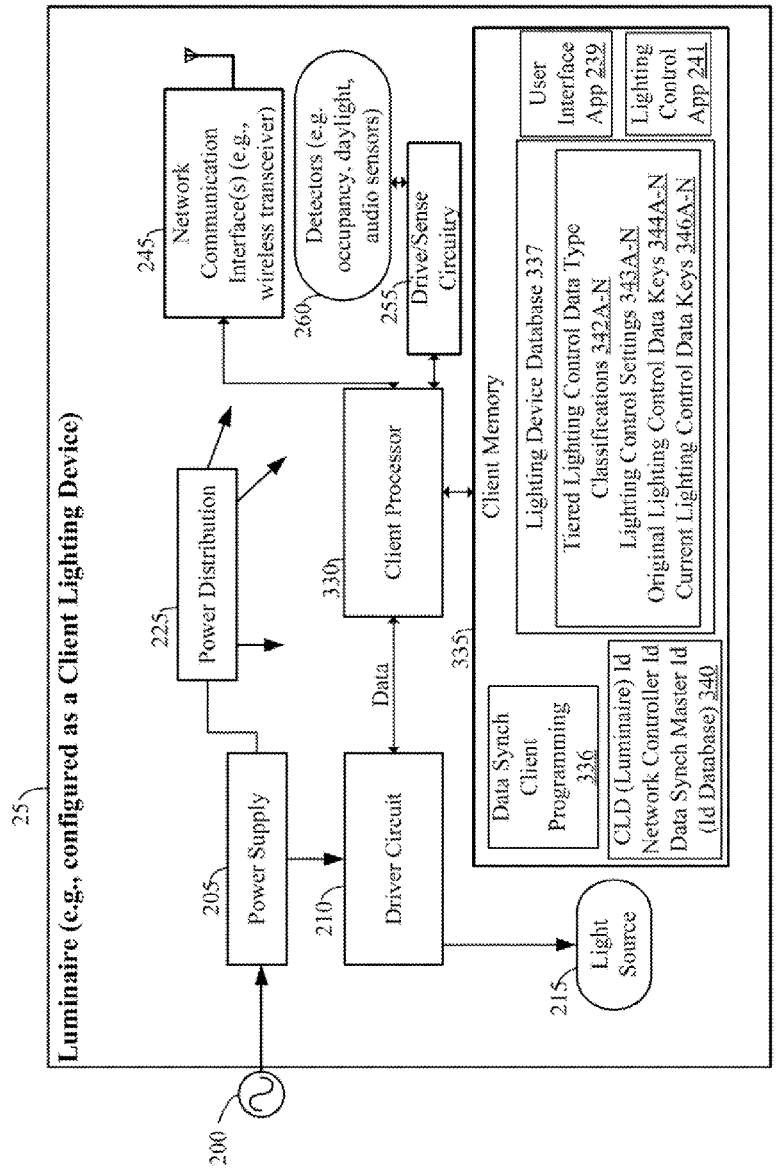
FIG. 3 is a block diagram of a luminaire configured as a client lighting device (CLD) that communicates via the lighting control system of FIG. 1.

FIG. 3 is a block diagram of a luminaire 25 configured as a client lighting device that communicates via the lighting control system of FIG. 1. Generally, client lighting devices can be a networked lighting luminaire, an occupancy sensor, a photo-sensor, a thermostat, a wall switch or other controls networked component. As part of the data synchronization process, the client lighting device has a unique address identifier and may have other optional identifiers. The circuitry, hardware, and software of luminaire 25 shown is similar to the network controller of FIGS. 2A-B. However, as shown, luminaire 25 can include a subset of the circuitry, hardware, and software shown for the network controller 15 of FIG. 2B.

Luminaire 25 may be a singularly addressable device designated by a luminaire identifier and is configured to operate as a member of a respective room network 60 as shown in FIG. 1, or a zone. Hence, the network communication interface(s) 345 of luminaire 25 may comprise a single radio for communication over room network 60, as opposed to the tri-band network communication interface of network controller 15 for communication over the three different types of networks 40, 50, 60. It should be understood that luminaire 25 may not necessarily include global and building lighting control setting data and user interface application 239 as part of the luminaire 25 structure, for example, to save on manufacturing and design costs.

Luminaire 25 is represented by a unique device identifier, such as a serial number, media access control (MAC) address, etc. In our example, the memory stores 335 stores an identifier database 340 that includes a luminaire identifier that can be an alphanumeric identifier that uniquely identifies luminaire 25 on a given room network, a network controller identifier that uniquely identifies the network controller that manages the luminaire, and a data synchronization master identifier that uniquely identifies the lighting control data synchronization master. Upon receipt of message from the network controller or lighting control data synchronization master at a luminaire 25 (client lighting device), the luminaire 25 checks a source identifier in get property, get property response, set property, and set property response messages to determine whether the source identifier matches the data synchronization master identifier or the stored network controller identifier the identifier database 340 in client memory 335. The luminaire 25 (client lighting device) also checks a destination identifier in get property, get property response, set property, and set property response messages to determine whether the destination identifier matches the stored luminaire identifier in the identifier database 340 in client memory 335.

Luminaire 25 is configured as a client lighting device (CLD) and thus the client memory 335 includes data synchronization client programming 336. Execution of the data synchronization client programming 336 in the client memory 335 further configures the luminaire 25 to store, in the lighting device database 337, the at least one tiered lighting control data type classification 342A-N, the at least one respective lighting control setting 343A-N, and the respective original lighting control data key 344A-N. After receiving respective current lighting control data key 346A-N for each respective tiered lighting control data type classification 342A-N, client lighting device compares each respective current lighting control data key 344A-N (i.e., master data key or system data key) with each respective original lighting control data key 344A-N (i.e., device data key or client data key). The comparison includes matching the 16 bit CRC, the hash value, the date, the timestamp, the other identifier, or the combination thereof to detect the state change in the at least one respective lighting control setting 343A-N. Based on not matching the respective current lighting control data key 346A-N to the respective original lighting control data key 344A-N for the respective tiered lighting control data type classification 342A-N, client lighting device 25 determines that the respective tiered lighting control data type classification 342A-N is not synchronized at the client lighting device 25.

Execution of the data synchronization client programming 336 in the client memory 335 further configures the client lighting device 25 to in response to determining that the respective tiered lighting control data type classification 342A-N is not synchronized at the client lighting device 25, send an update request message, to the lighting control data synchronization master 15, via the at least one lighting control network (e.g., 40, 50A-N, 60A-N), for the least one respective lighting control setting 343A-N. Execution of the data synchronization client programming 336 in the client memory 335 further configures the client lighting device 25 to receive, via the at least one lighting control network (e.g., 40, 50A-N, 60A-N), from the lighting control data synchronization master 15, a respective current lighting control setting 343A-N. Execution of the data synchronization client programming 336 in the client memory 335 further configures the client lighting device 25 to store, in the lighting device database 337 at the client lighting device 25, the respective current lighting control setting 343A-N and the respective current lighting control data key 346A-N for the respective tiered lighting control data type classification 342A-N.

The lighting device database 337 is a collection of configuration lighting control setting data for a given client lighting device. This lighting control setting data is local to each client lighting device and network controller 15 and is persisted in non-volatile memory or generated dynamically upon startup and used throughout runtime, retrieved by other messages, or other means. The lighting device database 337 has configuration parameters for how a client lighting device operates within the networked lighting control system 1. Example data would be a time delay for occupancy sensors to determine the room is vacant, the name of a device, user-interface control settings, LED behavior settings, lighting dim levels, etc.

Execution of the data synchronization client programming 336 in the client memory 335 further configures the client lighting device 25 to, in response to matching the respective current lighting control data key 346A-N to the respective original lighting control data key 344A-N for the respective lighting control data type classification 342A-N, determine that the respective lighting control data type classification 342A-N is synchronized at the client lighting device 25. Execution of the data synchronization client programming 336 in the client memory 335 further configures the client lighting device 25 to, in response to determining that the respective tiered lighting control data type classification 342A-N is synchronized at the client lighting device 25, halt an update request message from being sent to the lighting control data synchronization master 15, via the at least one lighting control network (e.g., 40, 50A-N, 60A-N), for the at least one respective lighting control setting 342A-N.

Figure 4B:
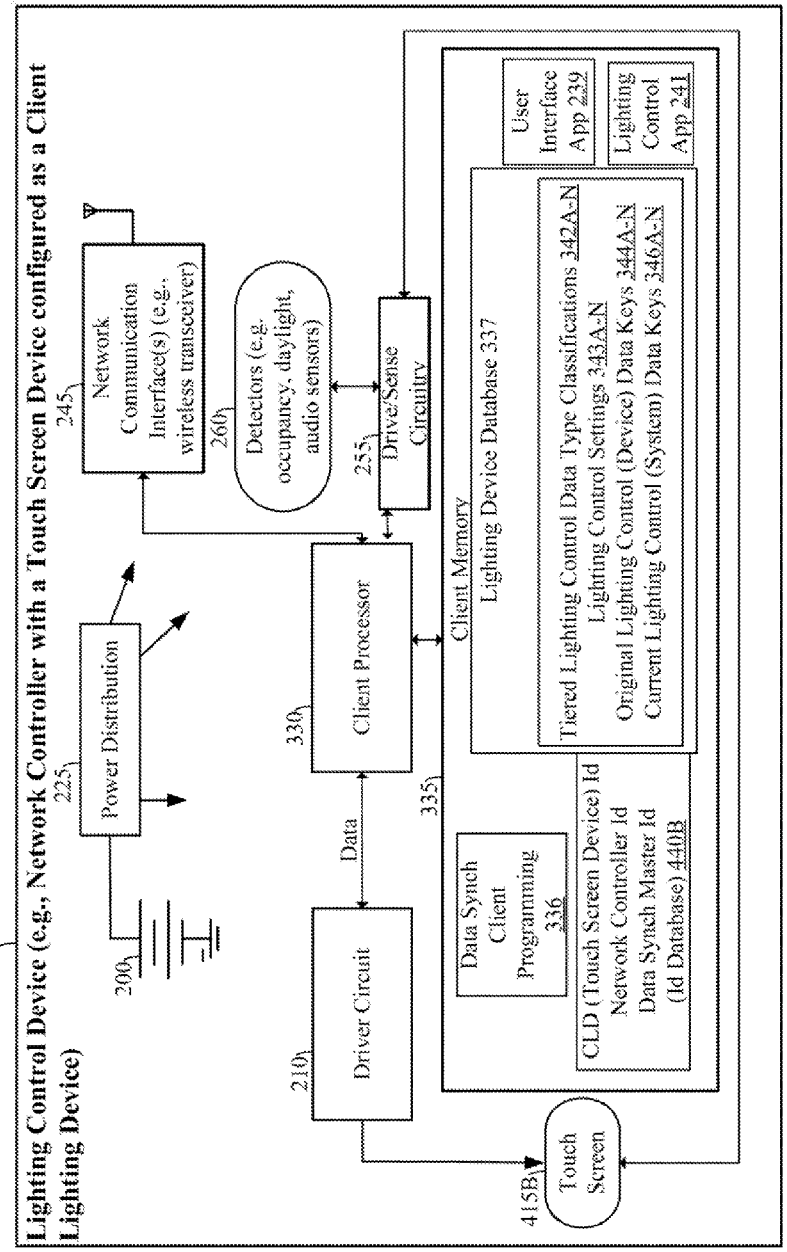

FIGS. 4A-C are block diagrams of various lighting control devices 30 configured as a client lighting device that communicate via the lighting control system of FIG. 1. The circuitry, hardware, and software of lighting control device 30 shown is similar to the network controller 15 of FIG. 2B and luminaire 25 of FIG. 3. However, lighting control device 30 is a device that processes lighting controls in order to control a luminaire 25, but typically does not itself include a light source for purposes of artificial illumination of a space intended for occupancy by a living organism (i.e., space lighting). In FIG. 4A, the lighting control device 30 is a wall switch or a button station configured as a client lighting device.

Lighting control device 30 may be a singularly addressable device designated by a lighting control device identifier and is configured to operate as a member of a respective room network 60 as shown in FIG. 1, or a zone. Hence, the network communication interface(s) 445 of lighting control device 30 may comprise a single radio for communication over room network, as opposed to the tri-band network communication interface of network controller 15 used to communicate over the three different types of lighting control networks 40, 50A-N, 60A-N.

Lighting control device 30 is represented by a unique device identifier, such as a serial number, media access control (MAC) address, etc. In our example, the memory stores 335 stores an identifier database 440A-C that includes a lighting control device identifier for the client lighting device (e.g., wall switch id or button station id in 440A, touch screen device id in 440B, and network controller id in 440C). These identifiers stored in the identifier databases 440A-C of FIGS. 4A-C can include alphanumeric identifiers that uniquely identify the client lighting devices on a given room network, a network controller identifier that uniquely identifies the network controller that manages the lighting control device, and a data synchronization master identifier that uniquely identifies the lighting control data synchronization master. Upon receipt of message from the network controller or lighting control data synchronization master at the lighting control device 30, the lighting control device 30 checks a source identifier in get property, get property response, set property, and set property response messages to determine whether the source identifier matches the data synchronization master identifier or the stored network controller identifier in the identifier database 440 in client memory 335. The lighting control device 30 also checks a destination identifier in get property, get property response, set property, and set property response messages to determine whether the destination identifier matches the stored lighting control device identifier in the identifier database 440A-C in client memory 335.

As shown in FIG. 4A, the lighting control device 30 is a wall switch where the drive/sense circuitry 255 responds to switches 460. Switches 460 can be an on/off switch, dimmer switch, or set scene switch based on Acuity Brands Lighting's commercially available xPoint® Wireless ES7 product. In our some examples, lighting control device 30 includes a single shared button switch 460 for on/off, dimming, or set scene functions and the LED indicator 415A of lighting control device 30. A button station can include various button settings that can have the lighting control settings adjusted, for example, four buttons can be arranged with two longitudinal buttons (north-south) and two lateral buttons (east-west).

In FIG. 4B, the lighting control device 30 is a network controller 15 with a touch screen configured as a client lighting device. For example, the lighting control device 30 is a touch screen device where lighting control setting adjustments are inputted via a user interface application 239 through manipulation or gestures on a touch screen 415B. For output purposes, the touch screen 415B includes a display screen, such as a liquid crystal display (LCD) or light emitting diode (LED) screen or the like. For input purposes, touch screen 415B includes a plurality of touch sensors.

A keypad may be implemented in hardware as a physical keyboard of touch screen device 30, and keys may correspond to hardware keys of such a keyboard. Alternatively, some or all of the keys (and keyboard) of lighting control device 30 may be implemented as "soft keys" of a virtual keyboard graphically represented in an appropriate arrangement via touch screen 415B. The soft keys presented on the touch screen 415B may allow the user of lighting control device 30 to invoke the same user interface functions as with the physical hardware keys.

Drive/sense circuitry 255 is coupled to touch sensors of touch screen 415B for detecting the occurrence and relative location/position of each touch with respect to a content display area of touch screen 415B. In this example, drive/sense circuitry 255 is configured to provide client processor 330 with touch-position information based on user input received via touch sensors. In some implementations, client processor 330 is configured to correlate the touch position information to specific content being displayed within the content display area on touch screen 415B. The touch-position information captured by the drive/sense circuitry 255 and provided to client processor 330 may include, but is not limited to, coordinates identifying the location of each detected touch with respect to the display area of touch screen 415B and a timestamp corresponding to each detected touch position. Accordingly, the client processor 330 determines input of a lighting control setting data and generates generate schedule event action messages.

In general, touch screen 415B and its touch sensors (and one or more keys, if included) are used to provide a textual and graphical user interface for the lighting control device 30. In an example, touch screen 415B provides viewable content to the user at lighting control device 30. Touch screen 415B also enables the user to interact directly with the viewable content provided in the content display area, typically by touching the surface of the screen with a finger or an implement such as a stylus.

In an example, a lighting control setting that is a lighting schedule event (also referred to herein as a "schedule event") is received by the network controller type of client lighting device 30 of FIG. 4C based on the received input to adjust luminaires. The lighting schedule event includes a lighting intensity or brightness adjustment and an event time to make the lighting intensity or brightness adjustment to the group of luminaires controlled by the first plurality of network controllers 15A-C of the first building network 50A. Client lighting device 30 can implement the procedure of FIG. 7 to update the lighting control data synchronization master.

In FIG. 4C, the lighting control device 30 includes detector(s) 260 configured as a lighting control device. Drive/sense circuitry 255 and detectors 260 can also be on-board the network controller 15. Detectors 260 can be infrared sensors for occupancy or motion detection, an in-fixture daylight sensor, an audio sensor, proximity sensor, light sensor, a temperature sensor, or other environmental sensor. The drive/sense circuitry 255 responds to detectors 260 (e.g., occupancy, daylight, and audio sensors) that are on-board the lighting control device 30 to generate lighting control events or setting data within the lighting control system 1.

FIG. 5A is a lighting system database 237 that includes five tiered lighting control data type classifications 242A-E, five current lighting control (system) data keys 246A-E, and fourteen lighting control settings 243A-N. As shown, the tiered lighting control data type classifications 242A-E include a local data 242A, a room data 242B, a building data 242C, a network data 244D, and/or a global data 244E. As further shown, the five current lighting control (system) data keys of the tiered lighting control data type classifications 242A-E are: FE44, AC1F, B31E, F21C, and D81A, respectively. There are fourteen lighting control settings 243A-N included within the five tiered lighting control data type classifications 242A-E. The lighting control settings 243A-N have respective data identifiers 505A-N and associated data values 510A-N.

Lighting control settings 243A-N can include a light-related adjustment (such as lighting intensity or brightness adjustment). The light-related adjustment can also be a color adjustment (e.g., color point), a color temperature adjustment (e.g., correlated color temperature). Lighting control settings 243A-N can include an event date and an event time to make the lighting intensity or brightness adjustment. Lighting control settings 243A-N can include a schedule event that may also designate a zone that specifies where to make the light-related adjustment. The schedule event is a lighting intensity or brightness adjustment and a time to make the lighting intensity or brightness adjustment. A zone is a group or collection of luminaires 25A-N that share space within an installation (e.g. a room or area) and may be defined by a zone identifier.

FIG. 5B is a lighting device database 337 that includes one tiered lighting control data type classification 342A, one original lighting control (device) data key 344A, one current lighting control (system) data key 346A, and four lighting control settings 343A-D. As shown, the tiered lighting control data type classification 342A-E include room data 342A. As further shown, the one original lighting control (device) data key 344A of the tiered lighting control data type classification 242A is BD12. As further shown, the one current lighting control (system) data key 346A of the tiered lighting control data type classification 342A is AC1F. Because the original lighting control (device) data key 344A does not match the current lighting control (system) data key 346A, the lighting control settings 505E-H of the tiered lighting control data type classification 342B from FIG. 5A in the lighting system database 237 is retrieved and stored as lighting control settings 343A-D. Hence, there are four lighting control settings 343A-D included within the tiered lighting control data type classifications 342A. The lighting control settings 343A-D have respective data identifiers 505E-H and associated data values 510E-H pulled from the lighting system database 237.

Various lighting control settings 243A-N are shown in the lighting system database 237 and lighting device database 337 of FIGS. 5A-B for various types of client lighting devices (network controllers 15A-N, luminaires 25A-N, and lighting control devices 30A-N). In a first example shown in FIGS. 5A-B, the client lighting device includes luminaire(s) 25 (see data identifier 505F). The respective tiered lighting control data type classification 242B, 342A includes the room data. The at least one respective lighting control setting 243F, 343A for the respective tiered lighting control data type classification 242F, 342A is a trim level of the luminaire (see data value 510F). Alternatively or additionally, the at least one respective lighting control setting 243G, 343A for the respective tiered lighting control data type classification 242B, 342A is a switch identifier (see data identifier 505G) that controls the luminaire (see data value 510G).

In a second example, as shown in FIG. 5A, the client lighting device includes the detector type lighting control device(s) 30 and the detector(s) includes an occupancy sensor (see data identifier 505J). The respective tiered lighting control data type classification 242C includes the building data. The at least one respective lighting control setting 243J for the respective tiered lighting control data type classification 242J is a time delay (see data value 510J).

In a third example, as shown in FIG. 5A, the client lighting device includes the wall switch or the button station type lighting control device(s) 30 (see data identifiers 505K, 505L). The respective tiered lighting control data type classification includes the building data 242C. The at least one respective lighting control setting 243K, 243L for the respective tiered lighting control data type classification 242C is a timeout period for the switch (see data value 510K) or a button configuration setting for the button station (see data value 510L).

In a fourth example as shown in FIG. 5A, the client lighting device includes the network controller 15 (see data identifier 505M). The network controller 15 has a touch screen device. The respective tiered lighting control data type classification 242D includes the network data. The at least one respective lighting control setting 243M is a graphical user interface appearance of the touch screen device (see data value 510M).

In a fifth example shown in FIG. 5A, the client lighting device includes the detector type of lighting control device 30 and the detector includes a daylight sensor (see data identifier 505N). The respective tiered lighting control data type classification 242E is the global data. The at least one respective lighting control setting 243N is an illumination light output based on a sensed daylight measurement by the daylight sensor (see data value 510N).

As will be described in FIGS. 6-7, the data synchronization process is composed of two processes: a client process and a server process. Due to the underlying protocol and mechanics of the system, we assume the lighting control network(s) are mostly reliable. If this were not the case, the system would largely be inoperable or exhibit undesirable behavior regardless of components within the system being configured (i.e. basic control and status messages would not function as expected). The data synchronization model involves classifying lighting control setting data, which are applicable to specific devices, logical groupings of devices, and the remainder of the system. The data synchronization server process is responsible for maintaining the current configuration of the system and distributing changes to configuration across the lighting control network. The data synchronization client process is responsible for notifying data synchronization servers of changes to configuration and requesting current configuration relevant to the client.

Configuration for the device itself and how it operates within the system is stored on each device which implements the client process, this data is in the lighting device database 337. The entire system configuration is stored on controllers, which implement the server process, this is the lighting system database 237.

The client-server synchronization process uses a data key, which is a 16-bit CRC, hash, or other generated sequence, which is used to uniquely identify data for each type of data in the data type classifications. For instance, the data key is unique for local data. When changes are made to it, the key will be different identifying it as a change from its previous state. A unique data key is present for each type of data. The client-server synchronization process uses this data key when comparing the lighting device database 337 with the lighting system database 237 with the intent to ensure the lighting device database 337 matches the configuration of the lighting system database 237 to reduce network congestion and eliminate unnecessary transfers of data over the lighting control network.

Devices can implement both the client and server data synchronization process; however, only a single device on the network would need to implement the server. A device implementing the server process can be manually designated or configured to be the server or use an automated process such as "lowest-address-wins" by which devices send messages to negotiate which ones will take on the role of a data synchronization server. A device, which is acting as a server of the data synchronization process, is called the synchronization master.

The data synchronization process can support multiple data synchronization servers, which will allow a greater tolerance in redundancy at the cost of a slower synchronization process. The lighting system database 237 model being distributed amongst the server components in the system and individual lighting device database 337 models maintained only at the device has several benefits as well. The lighting system database 237 can be backed up, restored, and persisted across network losses. The lighting device database 337 can be minimal as it contains data relevant only to the operation of the individual device. Configuration of devices can be modified while the device is offline due to the synchronization process updating the lighting device database 337 upon joining the network.

Changes to the lighting system database 237 are managed by a property change process included within both the client and server synchronization processes, as described in FIG. 7. The process is used to propagate requested changes to the system configuration such that upon completion either the lighting system database 237 will be updated to the expected operation of the lighting control network, or the originating device will be in the "out of sync" state and require synchronization from the master/server.

FIG. 6 is a flow chart illustrating functions implemented in the data synchronization client programming 336 of the client lighting devices of FIGS. 3 and 4A-C. A device which implements the data synchronization client maintains a set of data or a database relative to its operation. The data is classified according to one of the data type classifications.

Beginning in block 600, execution of the data synchronization client programming 336 in the client memory 335 configures the client lighting device to send a data request message to a lighting control data synchronization master in response to a startup event at the client lighting device or after a synchronization time period. For example, a periodic event or rate at which lighting control setting data is checked for synchronization. Typically, a broadcast message is announced or received unsolicited as a data key response message from the master indicating the current expected data key for each data type. This can be used to update devices, which may be in an "out of sync" state. This periodic rate can be optional and used to address unreliable communications and devices.

Upon device startup or the reset event, the client lighting device will use a comparison process with the data currently stored for the device against the server data. The client iterates through each type of data in the data type supported for the device and performs the comparison. The data key for the data stored locally for the device is compared against the server by issuing a data key request message and processing a data key response message.

Moving to block 605, a data key request message is sent to the lighting control data synchronization master. The data key request message has contents indicating the data type classification, potentially other data identifiers for specific data within a given data type classification and the data key. The source specifies the originator of the message (synchronization master) and the destination is a device requesting the corresponding data key.

Continuing to block 610, a data key response message is received from the lighting control data synchronization master. The data key response message has contents indicating the data type classification, potentially other data identifiers for specific data within a given data type classification and the data key. The source specifies the originator of the message (synchronization master) and the destination is a device requesting the corresponding data key.

Proceeding to blocks 615 and 620, the client lighting device compares the currently received system data key with the originally stored device data key. If all of the data keys match for each data type on the device, the device is considered to be in the device synchronization state of "in sync." The device will operate as expected according to system data configuration. Upon receipt of a data key response message, if the device data key is different from the data key in the response message (originated by device running synchronization server), the data of each data type is updated from the server system data by synchronization messages.

In block 625, if the system data key does not match the device data key, a get property message is sent to the lighting control data synchronization master. The get property message is sent as a request to retrieve data within the lighting system database 237 as part of the data synchronization process. The get property message contains address information for source and destination, the data type and identifiers, and the current data value.

Moving to blocks 630 and 635, a get property response message is received from the lighting control data synchronization master. The get property response message is sent as a response to confirm acknowledge or receipt of a get property message and report the requested data values to the source. The response is used to further process the requested data, such as updating the lighting device database data 337 data values 510A-N.

As shown in block 640, each of the data identifiers 505A-N and data values 510A-N are iteratively received for each of the lighting control settings 343A-N until the last of the lighting control data type classifications 342A-N is reached. Assuming all of the lighting control settings 343A-N are received, then in blocks 645 and 650, the device synchronization state is set to synchronized. Each device is in one of two states relating to having the correct and updated database for its configuration. The in synchronization (sync) state means the client lighting device or lighting control data synchronization master has the correct configuration and no changes are required. The device will operate as expected according to the lighting system database 237 configuration. The out of synchronization (sync) state means the client lighting device or lighting control data synchronization master does not have the correct configuration and some changes are required. The device may not operate as expected according to the lighting system database 237 configuration.

If any of the get property response messages are not received, then as shown in blocks 655 and 660, the device synchronization state is set to out of sync. The client lighting device may attempt to resynchronize with the light control data synchronization master after a synchronization time period. If the data synchronization client process fails it can be retried; however, it is expected that network stability is good enough that typical communications succeed. Otherwise, the device will remain in its currently configured state and possibly not operate as intended according to the current system data configuration. The device is considered to be in the device synchronization state of "out of sync."

FIG. 7 is a flow chart of a depicted property change process is implemented by both the data synchronization client and data synchronization server. This process is responsible for requested changes to the lighting device database 337 or lighting system database 237 by either user-interaction, physical device interaction, status changes, network events, or any other events. The process describes how a change will be applied to the current device or controller from an originating change request and is further propagated to the other master role data synchronization servers. Hence, FIG. 7 illustrates functions implemented in both the data synchronization client programming 336 of the client lighting devices of FIGS. 3 and 4A-C; and the data synchronization server programming 236 of the lighting control data synchronization master of FIGS. 2A-B.

Beginning in block 705, a set property event is detected. In one example, the client lighting device further includes a touch screen to receive user input to modify a first lighting control setting 343A of a first respective tiered lighting control data type classification 342A of the tiered lighting control data type classifications 342A-N. Execution of the data synchronization client programming 336 in the client memory 335 further configures the client lighting device to receive, via the touch screen, the user input to modify the first lighting control setting 343A of the first respective tiered lighting control data type classification 342A.

Proceeding to block 710, in response to receiving the user input, the client lighting device, sends, via the at least one lighting control network, to the lighting control data synchronization master, the modified first lighting control setting. As shown in block 710, a set property message is as a request to modify data within the lighting system database 237 as part of the data synchronization process. The set property message contains address information for source and destination, the lighting control data type classification 242A-N, 342A-N, data identifiers 505A-N, and the requested data value 510A-N change.

Moving to block 715, a set property response message is sent. The set property response message is sent as a response to confirm acknowledge or receipt of the set property message. The acknowledgement is used to confirm the change of data at the requested destination was successful. In block 716, if no set property response message is received, then as shown in block 717, the device synchronization state is set to out of synchronization. However, so long as set property response messages are received in block 715, then each of the lighting control data synchronization masters are each sent the set property message and respective set property response messages are received.

Following are examples implemented as a result of the set property response message being transmitted to the lighting control data synchronization master. Execution of the data synchronization server programming 236 configures the lighting control data synchronization master to receive, via the at least one lighting control network, a modified first lighting control setting of the first respective tiered lighting control data type classification. In response to receiving the modified first lighting control setting via the at least one lighting control network, the lighting control data synchronization master stores in the lighting system database 337 at the lighting control data synchronization master, the modified first lighting control setting for the first respective tiered lighting control data type classification. Synchronization master generates a modified lighting control data key for the first respective tiered lighting control data type classification based on the modified first lighting control setting. Synchronization master stores, in the lighting system database 237, the modified lighting control data key for the first respective tiered lighting control data type classification.

Synchronization master sends, via the at least one lighting control network, to some of the client lighting devices, the modified lighting control data key and the modified first lighting control setting for the first respective tiered lighting control data type classification. Synchronization master determines that multiple lighting control data synchronization masters exist within the lighting control system elements are connected together on the at least one lighting control network. In response to determining that the multiple lighting control data synchronization masters exist on the at least one lighting control network, synchronization master sends, via the at least one lighting control network, to the multiple lighting control data synchronization masters, the modified lighting control data key and the modified first lighting control setting for the first respective tiered lighting control data type classification.

Proceeding to block 720, if the last of the lighting control data synchronization masters successfully sends the set property response message, then the example client lighting device executing the set property procedure, compares its client lighting device identifier to the data synchronization master identifier which are both stored in the identifier database 340, 440A-C. As shown in block 730, if the client lighting device identifier does not match the data synchronization master identifier, then the lighting device database 337 is updated with the modified lighting control data setting. As shown in block 725, if the client lighting device identifier matches the data synchronization master identifier, then client lighting device is implementing the master role also. Hence, the lighting system database 237 stored on the client lighting device is also updated in block 730 along with the lighting device database 337 update of block 735. Finishing in blocks 740 and 745 the device synchronization state is set to in sync.

FIG. 8 depicts a format of the get property, get property response, set property, and set property response messages 800 as described in FIGS. 6-7. As shown, each of the messages 800 include a source identifier 801 and a destination identifier 802. Each of the messages 800 also include a lighting control data type classification 242 or 342. Each of the messages 800 includes data identifier(s) 505, for example, data identifiers 505A-N of the lighting control settings 243A-N of FIG. 5A; or data identifiers 505A-D of the lighting control settings 343A-D of FIG. 5B. Each of the messages 800 also includes data value(s) 510, for example, data values 510A-N of the lighting control settings 243A-N of FIG. 5A; or data values 505E-H of lighting control settings 343A-D of FIG. 5B.

Any of the lighting control setting data synchronization functionality described herein for the lighting system elements (e.g., network controllers 15A-N, luminaires 25A-N, and lighting control devices 30A-N) of the lighting control system 1 that are configured as client lighting devices and lighting control data synchronization server can be embodied in one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A lighting control system comprising:
 a plurality of lighting system elements that are connected together over at least one lighting control network, wherein:
  the lighting system elements include a network controller, a luminaire, or a lighting control device;
  some of the lighting system elements are designated as client lighting devices; and
  at least one of the lighting system elements is designated as a lighting control data synchronization master;

each respective one of the client lighting devices comprises:
- a client network communication interface for communication over the at least one lighting control network;
- a client memory including a lighting device database;
- a client processor having access to the client memory and the client network communication interface; and
- data synchronization client programming in the client memory, wherein execution of the data synchronization client programming by the client processor configures the client lighting device to perform functions, including functions to:
  - receive, via the at least one lighting control network, from the lighting control data synchronization master, multiple original lighting control data keys of tiered lighting control data type classifications, each respective original lighting control data key associated with a respective tiered lighting control data type classification to adjust at least one respective lighting control setting;
  - send, via the at least one lighting control network, from the client lighting device to the lighting control data synchronization master, a data key request message for each respective tiered lighting control data type classification that is supported on the client lighting device or desired for synchronization;
  - in response to the data key request message, receive, via the at least one lighting control network, from the lighting control data synchronization master, a data key response message that includes a respective current lighting control data key for each respective tiered lighting control data type classification;
  - for each respective tiered lighting control data type classification, compare the respective current lighting control data key with the respective original lighting control data key to detect a state change in the at least one respective lighting control setting; and
  - based on the comparison, determine whether each respective tiered lighting control data type classification is synchronized or not synchronized at the client lighting device.

2. The lighting control system of claim 1, wherein:
the lighting control data synchronization master includes:
- a server network communication interface for communication over the at least one lighting control network;
- a server memory including a lighting system database;
- a server processor having access to the memory and the server network communication interface; and
- data synchronization server programming in the memory, wherein execution of the data synchronization server programming by the server processor configures the lighting control data synchronization master to perform functions, including functions to:
  - for each tiered lighting control data type classification, store in the lighting system database, the at least one respective lighting control setting and the respective original lighting control data key; and
  - send, via the at least one lighting control network, to the client lighting device, at least one of the tiered lighting control data type classifications, the at least one respective lighting control setting, and the respective original lighting control data key; and
- execution of the data synchronization client programming in the client memory further configures the client lighting device to:
  - store, in the lighting device database, the at least one tiered lighting control data type classification, the at least one respective lighting control setting, and the respective original lighting control data key.

3. The lighting control system of claim 2, wherein execution of the data synchronization server programming in the server memory further configures the lighting control data synchronization master to:
- generate, each respective original lighting control data key as an identifier to uniquely identify the at least one respective lighting control setting of the respective tiered lighting control data type classification.

4. The lighting control system of claim 3, wherein:
the generated identifier is a 16 bit cyclic redundancy check (CRC), a hash value, a date, a timestamp, another identifier, or a combination thereof; and
execution of the data synchronization client programming in the client memory to compare each respective current lighting control data key with each respective original lighting control data key further configures the client lighting device to:
- match the 16 bit CRC, the hash value, the date, the timestamp, the other identifier, or the combination thereof to detect the state change in the at least one respective lighting control setting.

5. The lighting control system of claim 4, wherein execution of the data synchronization client programming in the client memory further configures the client lighting device to:
- based on not matching the respective current lighting control data key to the respective original lighting control data key for the respective tiered lighting control data type classification, determine that the respective tiered lighting control data type classification is not synchronized at the client lighting device.

6. The lighting control system of claim 5, wherein execution of the data synchronization client programming in the client memory further configures the client lighting device to:
- in response to determining that the respective tiered lighting control data type classification is not synchronized at the client lighting device, send an update request message, to the lighting control data synchronization master, via the at least one lighting control network, for the least one respective lighting control setting;
- receive, via the at least one lighting control network, from the lighting control data synchronization master, a respective current lighting control setting; and
- store, in the lighting device database at the client lighting device, the respective current lighting control setting and the respective current lighting control data key for the respective tiered lighting control data type classification.

7. The lighting control system of claim 4, wherein execution of the data synchronization client programming in the client memory further configures the client lighting device to:
- in response to matching the respective current lighting control data key to the respective original lighting control data key for the respective lighting control data type classification, determine that the respective lighting control data type classification is synchronized at the client lighting device.

8. The lighting control system of claim 7, wherein execution of the data synchronization client programming in the client memory further configures the client lighting device to:
in response to determining that the respective tiered lighting control data type classification is synchronized at the client lighting device, halt an update request message from being sent to the lighting control data synchronization master, via the at least one lighting control network, for the at least one respective lighting control setting.

9. The lighting control system of claim 1, wherein:
the client lighting device includes a luminaire, a wall switch, a button station, a network controller, or a detector; and
the tiered lighting control data type classifications include a local data, a room data, a building data, a network data, or a global data.

10. The lighting control system of claim 9, wherein:
the client lighting device includes the luminaire;
the respective tiered lighting control data type classifications includes the room data; and
the at least one respective lighting control setting for the respective tiered lighting control data type classification is a trim level of the luminaire or a switch identifier that controls the luminaire.

11. The lighting control system of claim 9, wherein:
the client lighting device includes the detector;
the detector is an occupancy sensor;
the respective tiered lighting control data type classifications includes the building data; and
the at least one respective lighting control setting for the respective tiered lighting control data type classification is a time delay.

12. The lighting control system of claim 9, wherein:
the client lighting device includes the wall switch or the button station;
the respective tiered lighting control data type classification includes the building data; and
the at least one respective lighting control setting for the respective tiered lighting control data type classification is a timeout period for the switch or a button setting for the button station.

13. The lighting control system of claim 9, wherein:
the client lighting device includes the network controller, the network controller having a touch screen device;
the respective tiered lighting control data type classification includes the network data; and
the at least one respective lighting control setting is a graphical user interface appearance of the touch screen device.

14. The lighting control system of claim 9, wherein:
the client lighting device includes the detector;
the detector includes a daylight sensor;
the respective tiered lighting control data type classification is the global data; and
the at least one respective lighting control setting is an illumination light output based on a sensed daylight measurement by the daylight sensor.

15. The lighting control system of claim 1, wherein execution of the data synchronization client programming in the client memory further configures the client lighting device to:
send the data request message to the lighting control data synchronization master in response to a startup event at the client lighting device or after a synchronization time period.

16. The lighting control system of claim 1, wherein:
the client lighting device further includes:
a touch screen to receive user input to modify a first lighting control setting of a first respective tiered lighting control data type classification of the tiered lighting control data type classifications; and
execution of the data synchronization client programming in the client memory further configures the client lighting device to:
receive, via the touch screen, the user input to modify the first lighting control setting of the first respective tiered lighting control data type classification; and
in response to receiving the user input, send, via the at least one lighting control network, to the lighting control data synchronization master, the modified first lighting control setting.

17. The lighting control system of claim 16, wherein execution of the data synchronization server programming in the server memory further configures the lighting control data synchronization master to:
receive, via the at least one lighting control network, the modified first lighting control setting of the first respective tiered lighting control data type classification;
in response to receiving the modified first lighting control setting via the at least one lighting control network, store in a lighting system database at the lighting control data synchronization master, the modified first lighting control setting for the first respective tiered lighting control data type classification;
generate a modified lighting control data key for the first respective tiered lighting control data type classification based on the modified first lighting control setting; and
store, in the lighting system database, the modified lighting control data key for the first respective tiered lighting control data type classification.

18. The lighting control system of claim 17, wherein execution of the data synchronization server programming in the server memory further configures the lighting control data synchronization master to:
send, via the at least one lighting control network, to some of the client lighting devices, the modified lighting control data key and the modified first lighting control setting for the first respective tiered lighting control data type classification.

19. The lighting control system of claim 17, wherein execution of the data synchronization server programming in the server memory further configures the lighting control data synchronization master to:
determine that multiple lighting control data synchronization masters exist within the lighting control system elements are connected together on the at least one lighting control network; and
in response to determining that the multiple lighting control data synchronization masters exist on the at least one lighting control network, send, via the at least one lighting control network, to the multiple lighting control data synchronization masters, the modified lighting control data key and the modified first lighting control setting for the first respective tiered lighting control data type classification.

20. A method comprising:

receiving, via at least one lighting control network, at a client lighting device from a lighting control data synchronization master, multiple original lighting control data keys of tiered lighting control data type classifications, each respective original lighting control data key associated with a respective tiered lighting control data type classification to adjust at least one respective lighting control setting;

sending, via the at least one lighting control network, from the client lighting device to a lighting control data synchronization master, a data key request message for each respective tiered lighting control data type classification that is supported on the client lighting device or desired for synchronization;

in response to the lighting control data key synchronization request message, receiving, via the at least one lighting control network, at the client lighting device from the lighting control data synchronization master, a data key response message that includes a respective current lighting control data key for each respective tiered lighting control data type classification;

for each respective tiered lighting control data type classification, comparing the respective current lighting control data key with the respective original lighting control data key to detect a state change in the at least one respective lighting control setting; and based on the comparison, determining whether each respective tiered lighting control data type classification is synchronized or not synchronized at the client lighting device.

* * * * *